US012656734B2

(12) United States Patent
Yuzawa et al.

(10) Patent No.: US 12,656,734 B2
(45) Date of Patent: Jun. 16, 2026

(54) IMAGE FORMING APPARATUS INCLUDING FIRST AND SECOND DUCTS

(71) Applicant: CANON KABUSHIKI KAISHA, Tokyo (JP)

(72) Inventors: Atsuyuki Yuzawa, Kanagawa (JP); Ryuji Hamasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/985,853

(22) Filed: Dec. 18, 2024

(65) Prior Publication Data

US 2025/0208565 A1 Jun. 26, 2025

(30) Foreign Application Priority Data

Dec. 20, 2023 (JP) ................................. 2023-215202

(51) Int. Cl.
*G03G 15/00* (2006.01)
*G03G 21/20* (2006.01)
*H04N 1/00* (2006.01)

(52) U.S. Cl.
CPC ....... *G03G 21/206* (2013.01); *G03G 15/6552* (2013.01); *G03G 15/6573* (2013.01);
(Continued)

(58) Field of Classification Search
CPC ........... G03G 15/6552; G03G 15/6573; G03G 21/206; G03G 21/1609;
(Continued)

(56) References Cited

U.S. PATENT DOCUMENTS 8,218,157 B2 * 7/2012 Saito .................. H04N 1/00631
399/92
9,335,735 B2 5/2016 Kayama et al.
(Continued)

FOREIGN PATENT DOCUMENTS

JP 2015141227 A 8/2015
JP 2017003713 A 1/2017
(Continued)

OTHER PUBLICATIONS

Extended European search report issued in Application No. 24221563. 0, dated Apr. 24, 2025.

*Primary Examiner* — Robert B Beatty
(74) *Attorney, Agent, or Firm* — ROSSI, KIMMS & McDOWELL LLP

(57) ABSTRACT

An image forming apparatus includes a reading unit including a reading portion, an image forming unit including an image bearing member, a fixing portion, and a discharging portion configured to discharge the sheet toward the discharging space in a sheet discharging direction, and a first duct extending in a first direction and configured to communicate an outside surface of the image forming unit to the discharging space, the first direction being along the sheet discharging direction and orthogonal to a rotation-axis direction of the image bearing member. The image forming unit includes a second duct which extends in the rotation-axis direction, and through which an air flow cooling the sheet discharged by the discharging portion passes. At least a portion of the first duct is disposed so as to overlap with the second duct in a second direction orthogonal to both of the first direction and the rotation-axis direction.

10 Claims, 8 Drawing Sheets

(52) U.S. Cl.
CPC .................. *H04N 1/00527* (2013.01); *G03G 2215/00421* (2013.01); *G03G 2221/1645* (2013.01)

(58) Field of Classification Search
CPC ... G03G 2215/00421; G03G 2221/1645; B41J 29/377; H04N 1/00527; H04N 2201/0091
USPC ................................................... 399/92, 405
See application file for complete search history.

(56) References Cited

U.S. PATENT DOCUMENTS

| | | | | |
|---|---|---|---|---|
| 2002/0076233 A1* | 6/2002 | Kaiho | .................. | G03G 21/206 |
| | | | | 399/92 |
| 2007/0110469 A1* | 5/2007 | Kasai | ................. | G03G 15/6552 |
| | | | | 399/93 |
| 2007/0196152 A1 | 8/2007 | Shimizu et al. | | |
| 2014/0029999 A1 | 1/2014 | Masuta | | |
| 2015/0132020 A1* | 5/2015 | Saito | .................. | G03G 15/2017 |
| | | | | 399/92 |
| 2016/0320749 A1* | 11/2016 | Komatsuzaki | ......... | B65H 29/14 |
| 2016/0357145 A1* | 12/2016 | Yoshimura | ......... | G03G 15/6573 |
| 2019/0155214 A1* | 5/2019 | Wakimoto | ......... | G03G 15/6573 |
| 2022/0019175 A1* | 1/2022 | Ogawa | ................. | B65H 29/246 |
| 2022/0276592 A1* | 9/2022 | Kanematsu | ........ | G03G 15/2017 |

FOREIGN PATENT DOCUMENTS

| | | |
|---|---|---|
| JP | 2017129807 A | 7/2017 |
| JP | 2018105940 A | 7/2018 |
| JP | 2021050050 A | 4/2021 |

* cited by examiner

---Prior Art---

DEW-CONDENSATION
ADHESION RANGE

DEW-CONDENSATION
ADHESION RANGE

IMAGE FORMING APPARATUS INCLUDING FIRST AND SECOND DUCTS

BACKGROUND OF THE INVENTION

Field of the Invention

The present invention relates to an image forming apparatus that forms images on sheets.

Description of the Related Art

Japanese Patent Application Publication No. 2015-141227 proposes an image forming apparatus that includes an image forming apparatus body and a document reading apparatus disposed above the image forming apparatus body. In such an image forming apparatus, water vapor produced in the image forming apparatus body is discharged from a sheet discharge port, and water vapor is produced from a sheet discharged from the sheet discharge port. In addition, in the image forming apparatus, a duct space is formed by a top surface of the image forming apparatus body and a bottom surface of the document reading apparatus. The duct space communicates with a space formed between the image forming apparatus body and the document reading apparatus, and with the back surface of the image forming apparatus. Thus, part of the water vapor that fills the above-described space is discharged to the back surface of the image forming apparatus through the duct space, due to the natural convection, so that the occurrence of dew condensation is suppressed in the bottom surface of the document reading apparatus.

In addition, Japanese Patent Application Publication No. 2017-3713 proposes an image forming apparatus that prevents sheets from sticking to each other due to remelting of toner on the sheets. In the image forming apparatus, an air blowing port is disposed above a nip of a discharging roller pair that discharges sheets, and the air is blown on the sheets from the air blowing port for suppressing the sheets from sticking to each other.

However, in the image forming apparatus described in Japanese Patent Application Publication No. 2015-141227, since the duct space is formed between the image forming apparatus body and the document reading apparatus, the image forming apparatus is upsized in the height direction, by the size of the duct space. Also, in the image forming apparatus described in Japanese Patent Application Publication No. 2017-3713, since it is necessary to dispose a duct for sending the air to the air blowing port disposed above the nip of the discharging roller pair, the image forming apparatus is upsized in the height direction, by the size of the duct.

As described above, if the image defect caused by the remelting of toner and the occurrence of dew condensation are suppressed, the image forming apparatus is upsized. Thus, it has not been possible that suppressing the image defect and the occurrence of dew condensation and downsizing the image forming apparatus are both achieved.

SUMMARY OF THE INVENTION

According to one aspect of the present invention, an image forming apparatus includes a reading unit including a reading portion configured to read an image of a document, an image forming unit disposed below the reading unit and configured to form a discharging space between the reading unit and the image forming unit, the image forming unit including an image bearing member configured to bear a toner image to be transferred to a sheet, a fixing portion configured to fix the toner image to the sheet by applying heat and pressure to the sheet, and a discharging portion configured to discharge the sheet, that has passed through the fixing portion, toward the discharging space in a sheet discharging direction, and a first duct extending in a first direction and configured to communicate an outside surface of the image forming unit to the discharging space, the first direction being along the sheet discharging direction and orthogonal to a rotation-axis direction of the image bearing member, the outside surface being formed on an upstream side of the image forming unit in the sheet discharging direction. The image forming unit includes a second duct which extends in the rotation-axis direction, and through which an air flow cooling the sheet discharged by the discharging portion passes. At least a portion of the first duct is disposed so as to overlap with the second duct in a second direction orthogonal to both of the first direction and the rotation-axis direction.

Further features of the present invention will become apparent from the following description of exemplary embodiments with reference to the attached drawings.

DESCRIPTION OF THE EMBODIMENTS

Hereinafter, the present embodiment will be described with reference to the accompanying drawings. Note that in the following description, the positional relationship in the up and down direction, the right and left direction, and the front and back direction is expressed with respect to an image forming apparatus 100 viewed from the front side (that is, viewed in FIG. 1A). In addition, in the following description, the front and back direction (the front and back direction) of the image forming apparatus 100 is defined as an X-axis direction, the right and left direction of the image forming apparatus 100 is defined as a Y-axis direction, and a height direction of the image forming apparatus 100 is defined as a Z-axis direction. The X-axis direction, the Y-axis direction, and the Z-axis direction are orthogonal to each other. The X-axis direction that serves as a first direction is a direction along a below-described sheet discharging direction DD. In addition, the X-axis direction is parallel to a horizontal direction and is orthogonal to the rotation-axis direction of a below-described photosensitive drum 42. The Y-axis direction is the rotation-axis direction of the photosensitive drum 42 that serves as an image bearing member. The Z-axis direction that serves as a second direction is the height direction of the image forming apparatus 100, and is parallel to the vertical direction and the gravity direction.

Schematic Configuration of Image Forming Apparatus

Figure 1A:
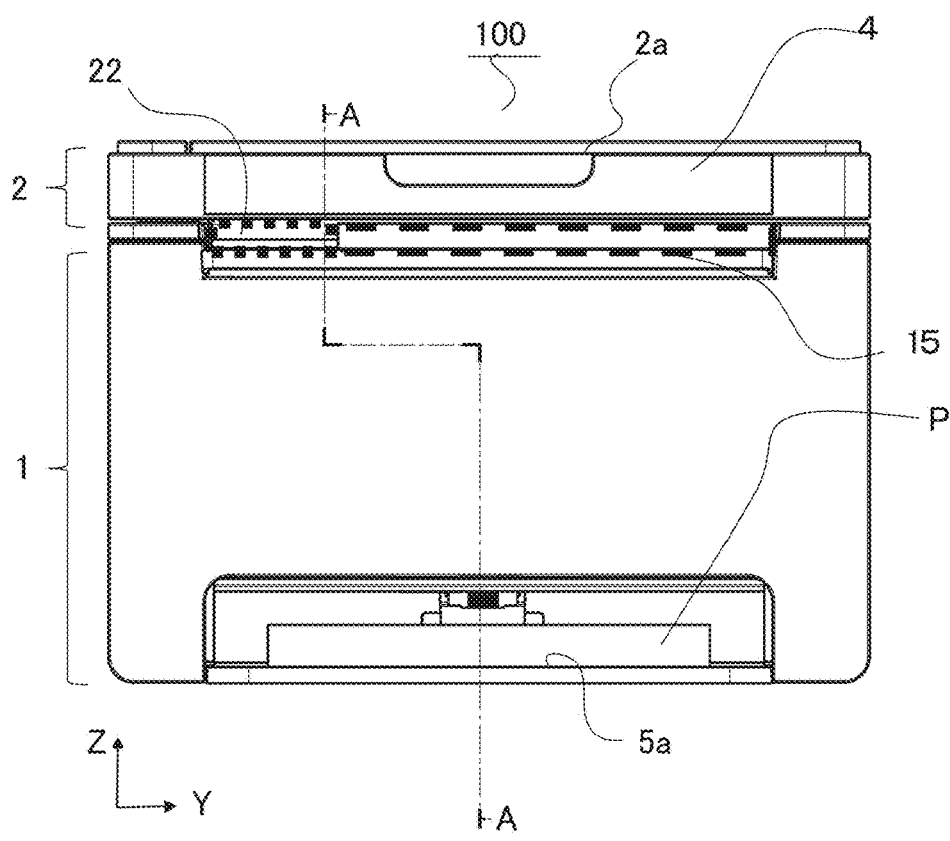
FIG. 1A is a front view illustrating an image forming apparatus.
Figure 1B:
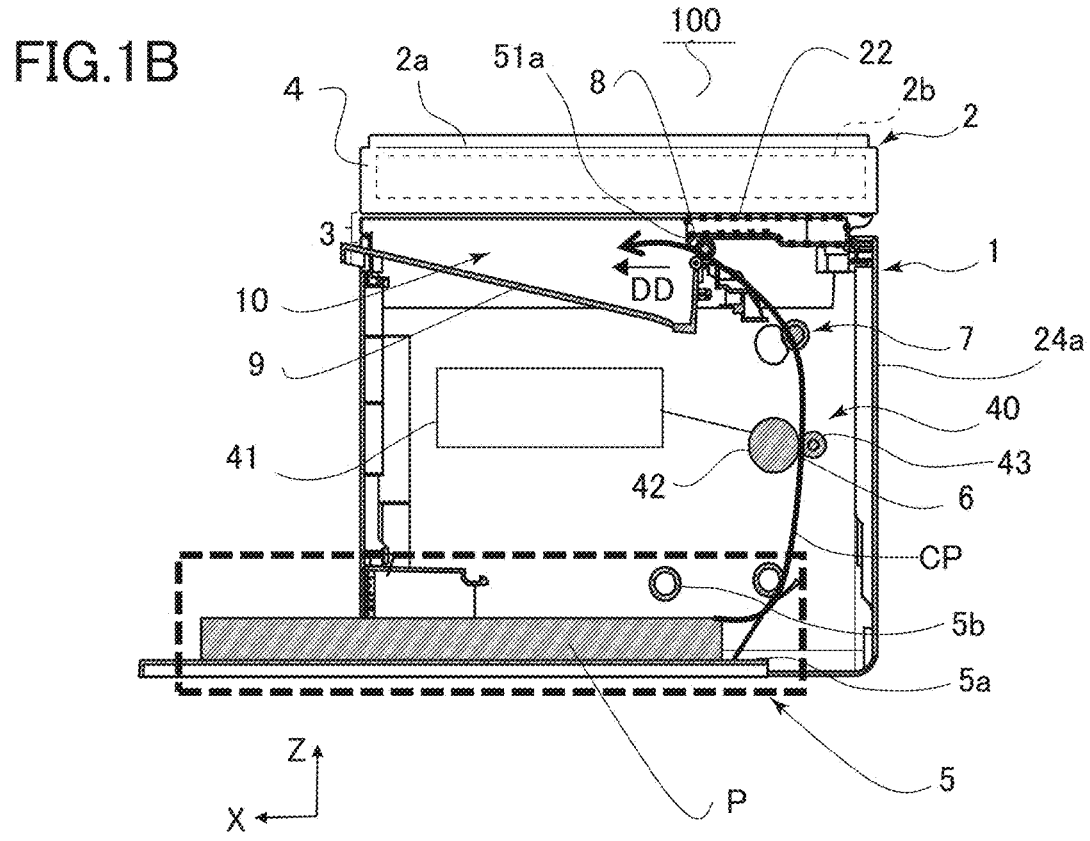
FIG. 1B is a cross-sectional view illustrating a cross section taken along a line A-A of FIG. 1A.

FIG. 1A is a front view illustrating the image forming apparatus 100. FIG. 1B is a cross-sectional view illustrating a cross section taken along a line A-A of FIG. 1A. The image forming apparatus 100 of the present embodiment is an electrophotographic monochrome laser-beam printer, and is a multifunction printer having a document reading function.

Note that examples of the image forming apparatus include a printer, a copying machine, a facsimile, and a multifunction printer; and the image forming apparatus forms images on sheets, used as a recording medium, in accordance with image information sent from an external PC or read from a document. In addition, there is a case in which an apparatus, such as an option feeder or a sheet processing apparatus, is attached to the body of the image forming apparatus that has the image forming function. In this case, the whole system in which the apparatus is attached to the body is also a type of the image forming apparatus. In addition, the document or the sheet may be a paper sheet, such as a sheet for any purpose or an envelope, a plastic film such as an overhead projector (OHT) sheet, or a cloth sheet.

As illustrated in FIGS. 1A and 1B, the image forming apparatus 100 includes a reading unit 2 that reads the image data of a document, and an image forming unit 1 disposed below the reading unit 2. The reading unit 2 is pivotally supported around an opening-and-closing shaft disposed in an upper and back portion of the image forming unit 1 so as to be opened and closed with respect to the image forming unit 1. The reading unit 2 includes a document platen glass 2a on which a document is placed, and a reading portion 2b which reads the image information of a document placed on the document platen glass 2a, by optically scanning the document. Note that the reading unit 2 may include an auto document feeder (ADF) that feeds a document placed on a document tray. The image information is converted into an electrical signal by the reading unit 2, and is sent to a control portion (not illustrated) disposed in the image forming unit 1.

The image forming unit 1 includes a feeding portion 5 that feeds a sheet P, an image forming portion 40 that forms an image on the sheet P, a fixing portion 7 that fixes the image to the sheet P, a discharging roller pair 8 that serves as a discharging portion, and the like. In addition, a discharging space 10 is formed between the reading unit 2 and the image forming unit 1, and the sheet P is discharged to the discharging space 10. In the discharging space 10, a discharging tray 9 is disposed, and the sheet P discharged to the discharging space 10 is stacked on the discharging tray 9.

The image forming portion 40 includes a laser scanner 41, the photosensitive drum 42, a charging roller (not illustrated), a developing roller (not illustrated), and a transfer roller 43. The charging roller and the developing roller are disposed around the photosensitive drum 42. The transfer roller 43, together with the photosensitive drum 42, forms a transfer nip 6.

Next, an image forming operation of the image forming apparatus 100 configured in this manner will be described. If the image data sent from a personal computer (not illustrated) or the like, or read by the reading unit 2 is inputted into the laser scanner 41, the photosensitive drum 42 is irradiated with a laser beam emitted from the laser scanner 41 and corresponding to the image data.

In this case, since the surface of the photosensitive drum 42 is uniformly charged in advance by the charging roller so as to have a predetermined polarity and potential, an electrostatic latent image is formed on the surface when the surface is irradiated with the laser beam from the laser scanner 41. The electrostatic latent image formed on the photosensitive drum 42 is developed by the developing roller, and a toner image is formed on the photosensitive drum 42.

In parallel with the image forming process, a sheet P placed on a sheet tray 5a of the feeding portion 5 is fed to a conveyance path CP by a pickup roller 5b. The toner image formed on the photosensitive drum 42 is transferred, at the transfer nip 6, onto the sheet P fed by the pickup roller 5b, by the transfer bias applied to the transfer roller 43. The sheet P onto which the toner image has been transferred is then applied with predetermined heat and pressure by the fixing portion 7, so that the toner is melted and solidifies (fixed). The sheet P having passed through the fixing portion 7 is discharged to the discharging tray 9 by the discharging roller pair 8.

Discharging Space

Figure 2A:
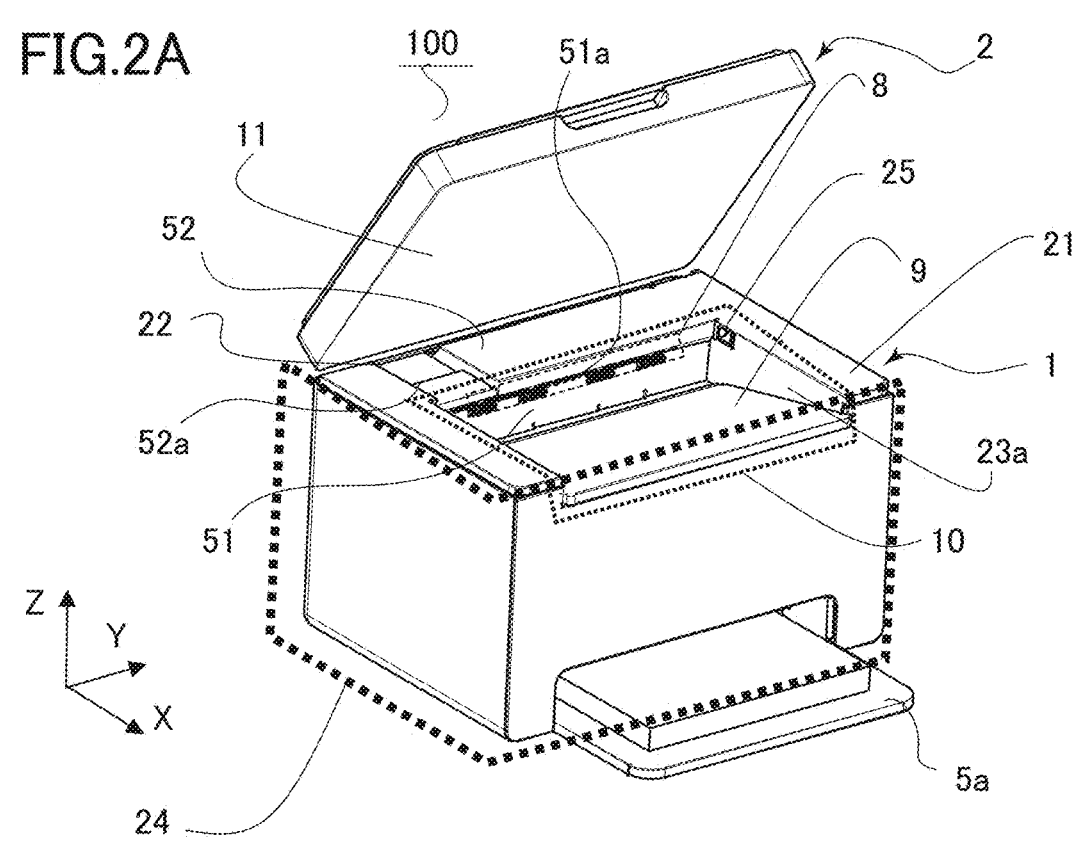
FIG. 2A is a perspective view illustrating the image forming apparatus.
Figure 2B:
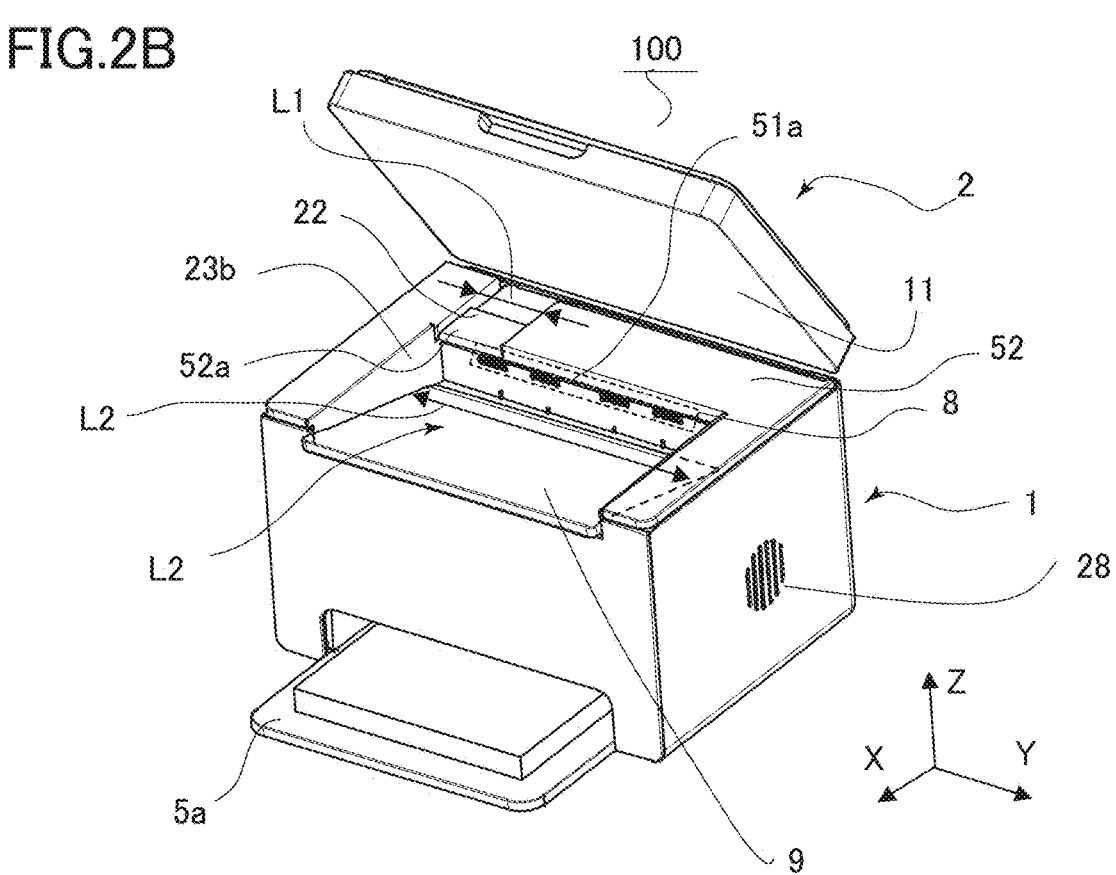
FIG. 2B is another perspective view illustrating the image forming apparatus.

Next, the discharging space 10 will be described with reference to FIGS. 1A to 2B. FIG. 2A is a perspective view illustrating the image forming apparatus 100. FIG. 2B is another perspective view illustrating the image forming apparatus 100. Note that in FIGS. 2A and 2B, the reading unit 2 is opened with respect to the image forming unit 1.

As illustrated in FIGS. 1A and 1B, the discharging space 10, to which the sheet P is discharged in the sheet discharging direction DD, is formed between the image forming unit 1 and the reading unit 2. In a state where the reading unit 2 is closed with respect to the image forming unit 1, the discharging space 10 is covered by the image forming unit 1 and the reading unit 2, except for an opening portion 3 of the image forming apparatus 100 on the front side.

More specifically, as illustrated in FIGS. 2A and 2B, the discharging space 10 is formed by the discharging tray 9, on which the discharged sheet P is stacked, a rising surface 51, a first side-surface 23a, a second side-surface 23b, and a bottom surface 11 of the reading unit 2. The rising surface 51 extends in the Y-axis direction and the Z-axis direction. In the rising surface 51, a sheet discharge port 51a, through which the sheet P discharged by the discharging roller pair 8 passes, is formed.

The discharging tray 9 that serves as a stacking surface extends upward as the discharging tray 9 extends downstream in the sheet discharging direction DD. The first side-surface 23a is formed on a first side (i.e., the right side) of the discharging tray 9 in the Y-axis direction, and extends in the X-axis direction and the Z-axis direction. The second side-surface 23b is formed on a second side (i.e., the left side) of the discharging tray 9 in the Y-axis direction, and extends in the X-axis direction and the Z-axis direction. In the first side-surface 23a, a side-surface opening 25 that serves as a second discharge port is formed.

In addition, the image forming unit 1 includes a side cover 24 that forms an exterior surface. As illustrated in FIG. 1B, the side cover 24 includes a back surface 24a that serves as an outside surface of the image forming unit 1 on the upstream side in the sheet discharging direction DD. In the right side-surface of the side cover 24, an intake louver 28 having a plurality of holes is formed. The image forming unit 1 also includes a top cover 52 that forms a top surface of the image forming unit 1. In the top cover 52, a concave portion 52a is formed, and the concave portion 52a is concaved so as to be separated from the bottom surface 11 of the reading unit 2. The concave portion 52a and the bottom surface 11 of the reading unit 2 form a first duct 22 that extends in the X-axis direction. The first duct 22 communicates the discharging space 10 with the back sur-face 24a of the image forming unit 1.

In the Y-axis direction, a width L1 of the first duct 22 is smaller than a width L2 of the discharging tray 9. The first duct 22 is disposed at a position closer to the second side-surface 23b than to the first side-surface 23a in the Y-axis direction. More specifically, the first duct 22 is formed such that one end surface of the first duct 22 in the Y-axis direction is flush with the second side-surface 23b.

Structure of Duct and Flow of Air Flow

Figure 3A:
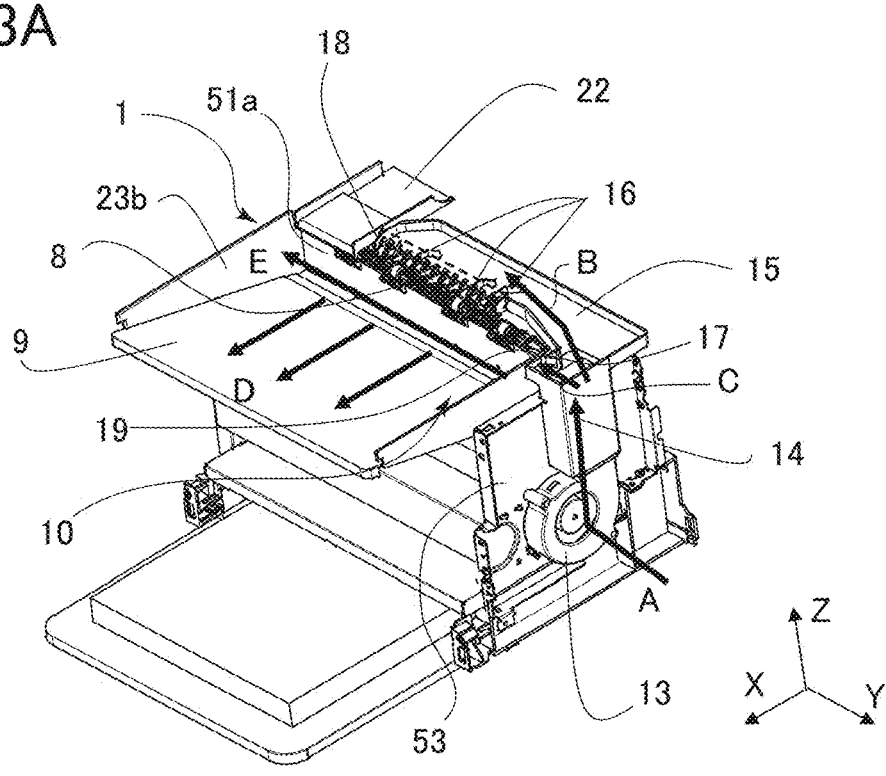
FIG. 3A is a perspective view illustrating an image forming unit in a state where a side cover is removed.
Figure 3B:
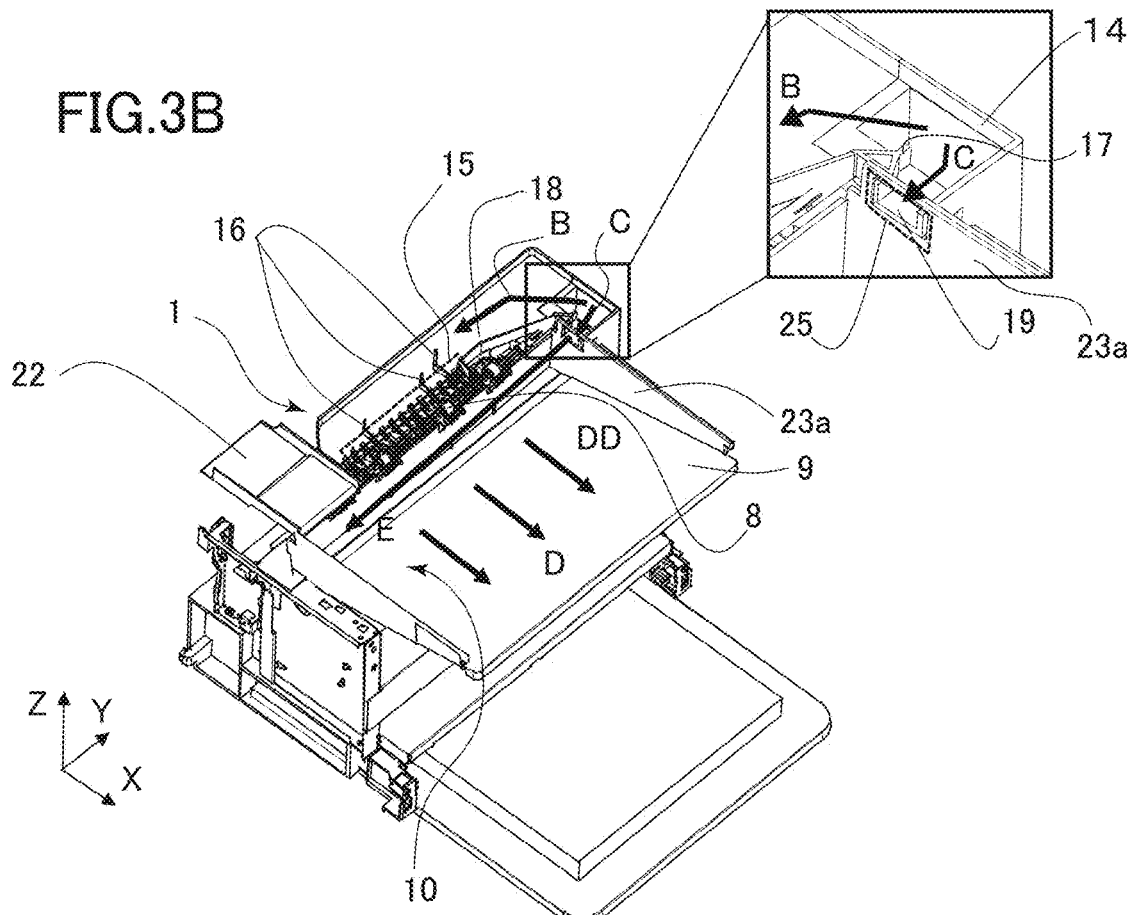
FIG. 3B is another perspective view illustrating the image forming unit in the state where the side cover is removed.
Figure 4A:
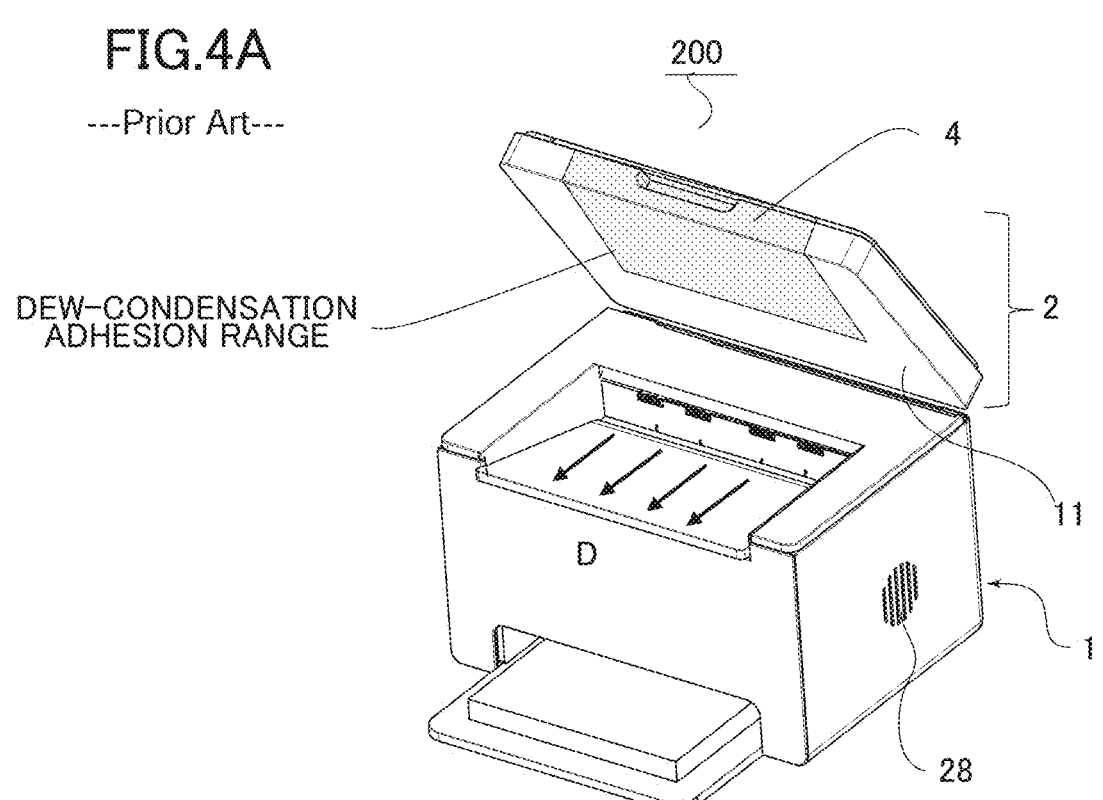
FIG. 4A is a perspective view illustrating a dew-condensation adhesion range of an image forming apparatus of a comparative example.
Figure 4B:
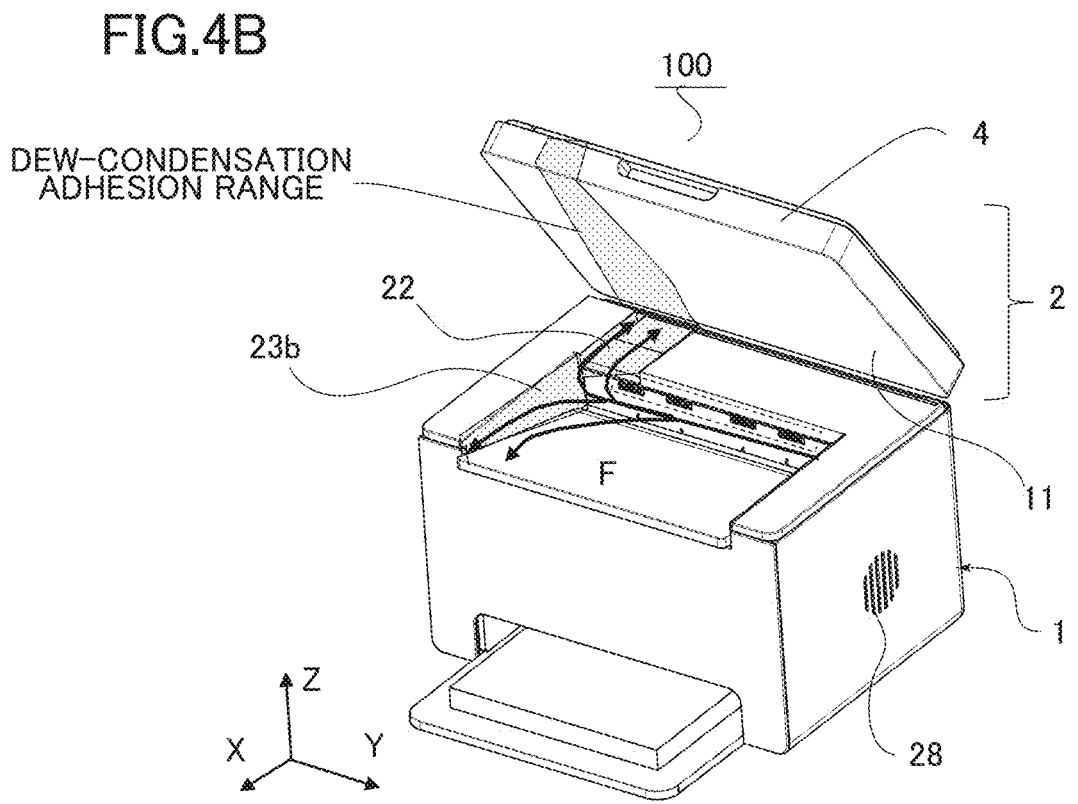
FIG. 4B is a perspective view illustrating a flow of air flow and a dew-condensation adhesion range of an image forming apparatus of the present embodiment.

Next, a structure of a duct formed in the image forming unit 1 and a flow of air flow will be described with reference to FIGS. 3A to 4B. FIG. 3A is a perspective view illustrating the image forming unit 1 in a state where the side cover 24 is removed. FIG. 3B is another perspective view illustrating the image forming unit 1 in the state where the side cover 24 is removed. FIG. 4A is a perspective view illustrating a dew-condensation adhesion range of an image forming apparatus 200 of a comparative example. FIG. 4B is a perspective view illustrating a flow of air flow and a dew-condensation adhesion range of the image forming apparatus 100 of the present embodiment.

As illustrated in FIG. 3A, the image forming unit 1 includes a fan 13, an intermediate duct 14, and a second duct 15. Note that a direction from the first side-surface 23a (see FIG. 2A) toward the second side-surface 23b (see FIG. 2B) in the Y-axis direction is defined as a −Y direction that serves as a first axis direction. The fan 13 and the intermediate duct 14 are disposed upstream of the discharging space 10 in the −Y direction. For example, the fan 13 and the intermediate duct 14 are fixed to a side plate 53 that is a part of a frame of the image forming unit 1.

The fan 13 sends air flow toward the intermediate duct 14. The intermediate duct 14 that serves as a third duct extends in the Z-axis direction. Note that although the fan 13 is a centrifugal fan in the present embodiment, the present disclosure is not limited to this. For example, the fan 13 may be an axial-flow fan that sends air flow along the rotation-axis direction of the blade portion.

The air (outside air) taken in from the intake louver 28 (see FIG. 2B) by the fan 13 flows in the intermediate duct 14, as indicated by an arrow A. As illustrated in FIG. 3B, at an upper end portion of the intermediate duct 14, a branch portion 17 is disposed for branching the air flow generated by the fan 13. The air flow that has flowed in the interme-diate duct 14 is divided, by the branch portion 17, into air flow that flows toward the second duct 15 in a direction indicated by an arrow B, and into the air flow that flows in a direction indicated by an arrow C, toward the side-surface opening 25 formed in the first side-surface 23a, through a side-surface discharge port 19 formed in an upper end portion of the intermediate duct 14. That is, the intermediate duct 14 guides part of the air flow generated by the fan 13, to the second duct 15.

The second duct 15 extends in the Y-axis direction, and the air flow for cooling the sheet to be discharged by the discharging roller pair 8 flows in the second duct 15. More specifically, the air flow that will flow from the upper end portion of the intermediate duct 14 toward the above-described direction indicated by the arrow B flows into the second duct 15, and the air flow flows in the second duct 15 toward the −Y direction. In other words, the fan 13 generates the air flow that flows in the second duct 15 toward the −Y direction.

The direction of the air flow that flows in the −Y direction in the second duct 15 is changed to a direction along the sheet discharging direction DD, by a plurality of rectifying plates 16 disposed in the second duct 15. In the rising surface 51, a cooling discharge port 18 that communicates the second duct 15 with the discharging space 10 is formed. The cooling discharge port 18 that serves as a first discharge port may be formed integrally with, or separated from the sheet discharge port 51a (see FIG. 2A).

The air flow whose direction has been changed to the direction along the sheet discharging direction DD by the plurality of rectifying plates 16 passes through the cooling discharge port 18, and is discharged toward the discharging space 10 in a direction indicated by an arrow D. The air flow discharged, in this manner, toward the discharging space 10 in the direction indicated by the arrow D is defined as a first air flow. The first air flow cools the sheet P discharged to the discharging space 10 by the discharging roller pair 8. The sheet P cooled by the first air flow and discharged to the discharging space 10 is stacked on the discharging tray 9.

Since the sheet P stacked on the discharging tray 9 is cooled by the first air flow, the temperature of the toner becomes equal to or lower than the remelting temperature of the toner. Thus, the sticking of sheets and the image defect caused by the remelting of toner can be suppressed. Note that the air flow that flows in the −Y direction in the second duct 15 may cool the sheet P in the image forming unit 1 before the sheet P is discharged to the discharging space 10. That is, the cooling discharge port 18 may discharge the air flow that is generated in the second duct 15, and that cools the sheet P to be conveyed by the discharging roller pair 8.

On the other hand, the air flow that is branched by the branch portion 17, and that flows in a direction indicated by an arrow C is discharged from the side-surface opening 25 toward the discharging space 10 in a direction indicated by an arrow E. The air flow that flows, in this manner, in the direction indicated by the arrow E is defined as a second air flow. The direction indicated by the arrow E is a direction along the −Y direction, and the second air flow (E) merges with the first air flow (D) in the discharging space 10. If the air flow into which the second air flow merges with the first air flow is defined as a third air flow, the third air flow flows in a direction indicated by an arrow F, as illustrated in FIG. 4B.

For comparison, an image forming apparatus 200 of a comparative example, as illustrated in FIG. 4A, will be described. The image forming apparatus 200 does not include the above-described first duct 22 and side-surface opening 25 of the present embodiment. Thus, in the image forming apparatus 200, only the above-described first air flow (D) serves as the cooling air flow for cooling the sheet P, and the first air flow is discharged to the discharging space 10 in the direction indicated by the arrow D. In this case, the discharging space 10 is filled with the water vapor produced in the fixing portion 7 and the water vapor produced from the sheet P.

Since the image forming apparatus 200 does not include the first duct 22, the water vapor that fills the discharging space 10 adheres, as dew condensation, to the bottom surface 11 of the reading unit 2. The dew-condensation adhesion range hatched in FIG. 4A is almost equal to the whole range of the bottom surface 11 that forms the discharging space 10.

On the other hand, in the present embodiment, as illustrated in FIG. 4B, the third air flow, indicated by the arrow F and produced by the first air flow (D) and the second air flow (E) merging each other, abuts against the second side-surface 23b. This is because the second air flow (E) flows in the –Y direction. A part of the air flow that has abutted against the second side-surface 23b passes through the first duct 22 and is discharged toward the back surface 24a of the image forming unit 1. Another part of the air flow flows along the second side-surface 23b and is discharged from the opening portion 3 (see FIG. 1B) of the image forming apparatus 100 on the front side.

Figure 5A:
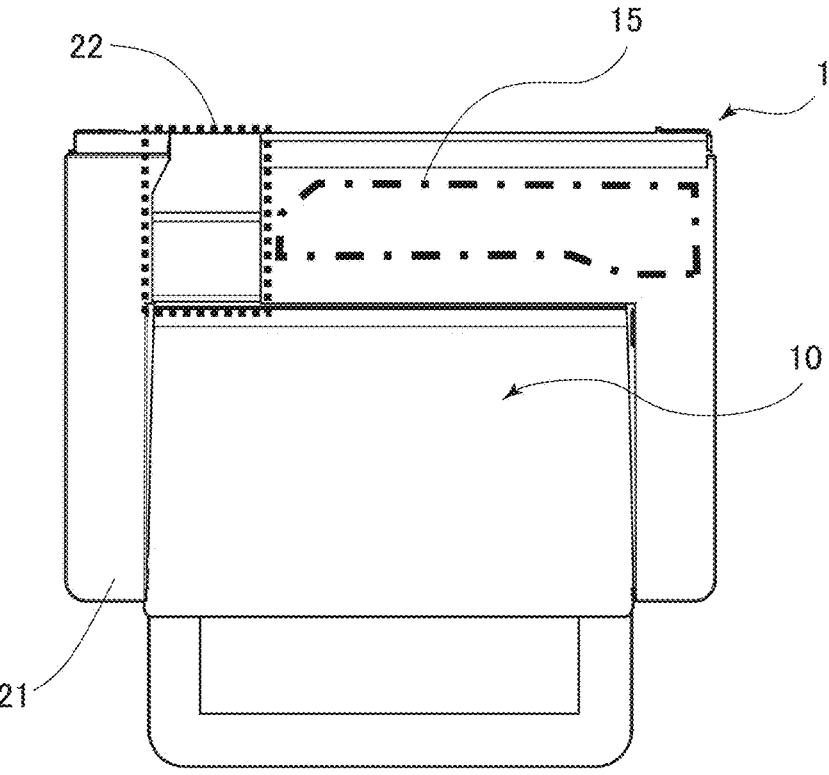
FIG. 5A is a plan view illustrating a first duct and a second duct of the present embodiment.
Figure 5B:
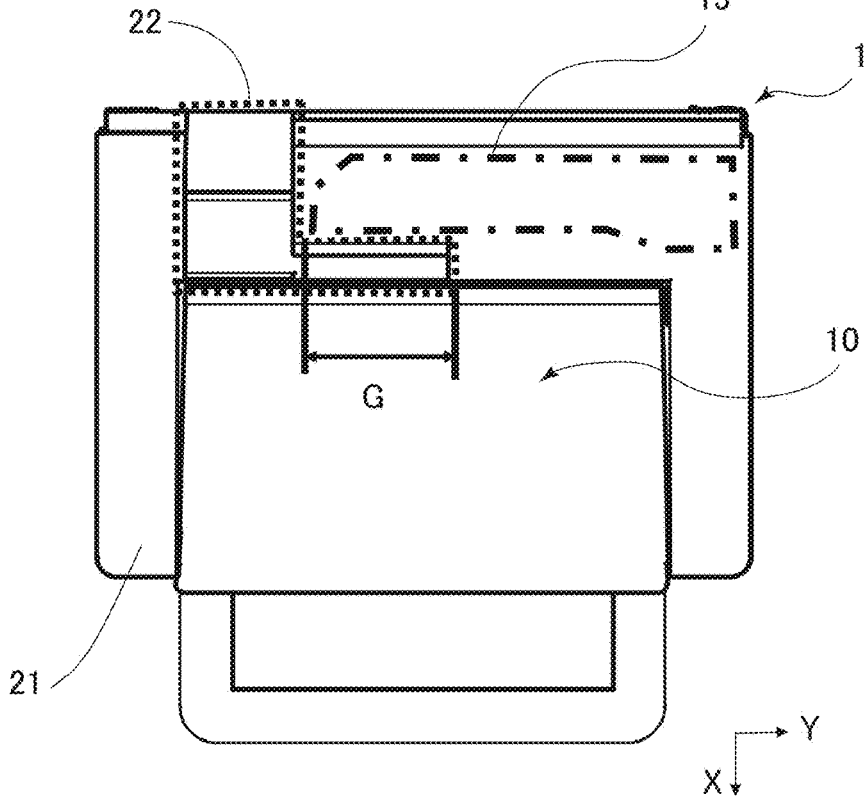
FIG. 5B is a plan view illustrating a first duct and a second duct of a first modification.

As a result, the resulting dew-condensation adhesion range of the present embodiment, hatched in FIG. 4B, is divided into the second side-surface 23b, the first duct 22, and part of the reading unit 2. The dew-condensation adhesion range is formed only on the –Y direction side (i.e., the left side) of the discharging space 10, but is not formed on the Y direction side (i.e., the right side) of the discharging space 10. In addition, each of a dew-condensation adhesion range formed in the bottom surface 11 of the reading unit 2 and a dew-condensation adhesion range formed on the front side is smaller than the corresponding dew-condensation adhesion range of the comparative example illustrated in FIG. 4A. Thus, the risk that the dew condensation will adhere to a user or the sheet P discharged by the discharging roller pair 8 can be reduced, and the reduction in image defect and the improvement in usability can be achieved. Arrangement of First Duct and Second Duct Next, arrangement of the first duct 22 and the second duct 15 will be described with reference to FIG. 1A and FIGS. 5A and 5B. FIG. 5A is a plan view illustrating the first duct 22 and the second duct 15 of the present embodiment. FIG. 5B is a plan view illustrating a first duct 22 and a second duct 15 of a first modification.

As illustrated in FIG. 1A, in the present embodiment, the first duct 22 is disposed at a position whose height is equal to the height of the position of the second duct 15 in the Z-axis direction. Note that although the height of the position of the first duct 22 and the height of the position of the second duct 15 are equal to each other in the present embodiment, at least a portion of the first duct 22 has only to overlap with the second duct 15 in the Z-axis direction. In addition, as illustrated in FIG. 5A, the first duct 22 is formed so as not to overlap with the second duct 15 in the Y-axis direction. That is, the first duct 22 is disposed, side by side, with the second duct 15 in the Y-axis direction.

By arranging the first duct 22 and the second duct 15 as described above, the image forming apparatus 100 can be downsized, especially in the Z-axis direction. In addition, since the sheet P can be cooled by the air flow that flows through the second duct 15, the image defect caused by the remelting of toner can be reduced. In addition, since the first duct 22 is formed in the image forming apparatus 100, and the second air flow (E) that flows from the side-surface opening 25 in the –Y direction is merged with the first air flow (D) that flows in the direction indicated by the arrow D, the dew-condensation adhesion range can be reduced, and the occurrence of dew condensation can be suppressed. That is, suppressing the image defect and the occurrence of dew condensation, and downsizing the image forming apparatus 100 can be both achieved.

In addition, since convection (F) is produced, by force, by merging the second air flow (E) that flows in the –Y direction with the first air flow (D) that flows in the direction indicated by the arrow D, the cross-sectional area of the first duct 22 can be reduced. In addition, since the image forming apparatus 100 can be downsized, the flexibility in installation location for a user can be increased, and the usability can be improved.

First Modification

In a first modification illustrated in FIG. 5B, the shape of the first duct 22 is changed. That is, in the first duct 22 illustrated in FIG. 5B, the side of the first duct 22 that communicates with the discharging space 10 is increased in the Y-axis direction. That is, a portion G of the first duct 22 is formed so as to overlap with the second duct 15 in the Y-axis direction. With this structure, the amount of air flow that flows from the discharging space 10 into the first duct 22 increases, so that the occurrence of image defect and dew condensation can be further suppressed.

Second Modification

Figure 6A:
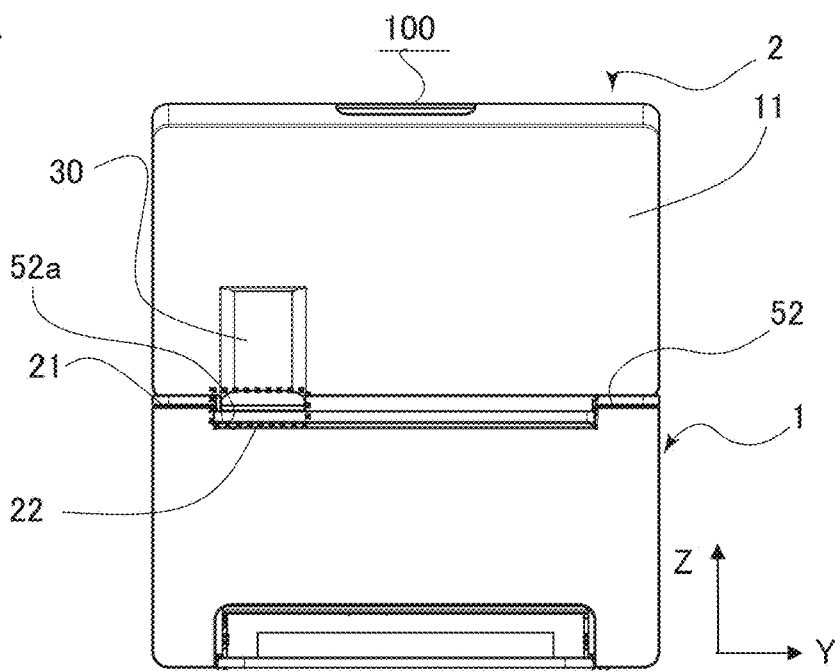
FIG. 6A is a front view illustrating an image forming apparatus of a second modification.
Figure 6B:
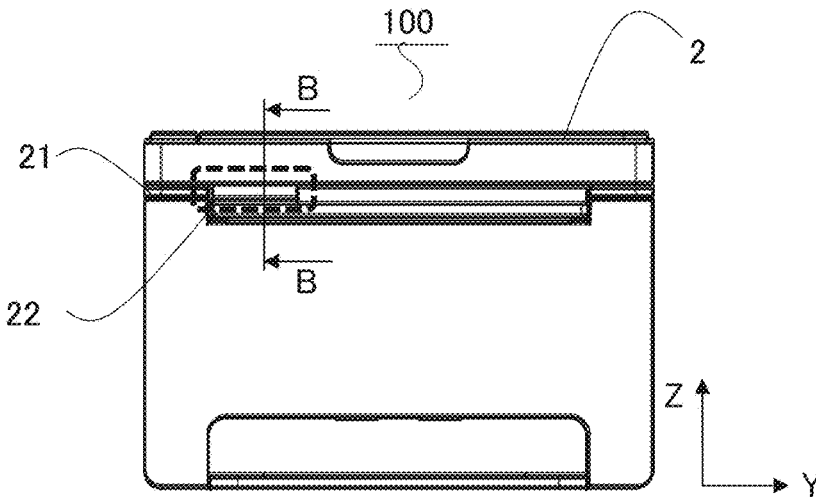
FIG. 6B is a front view illustrating the image forming apparatus of the second modification.
Figure 6C:
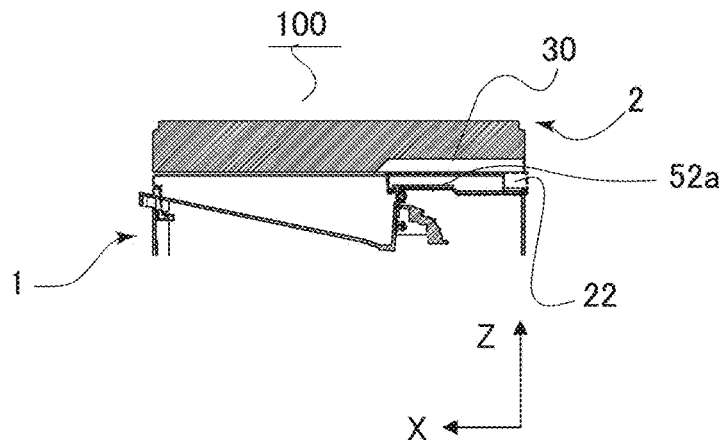
FIG. 6C is a cross-sectional view illustrating a cross section taken along a line B-B of FIG. 6B.

FIG. 6A is a front view illustrating an image forming apparatus 100 of a second modification. FIG. 6B is a front view illustrating the image forming apparatus 100 of the second modification. FIG. 6C is a cross-sectional view illustrating a cross section taken along a line B-B of FIG. 6B.

As illustrated in FIGS. 6A to 6C, in the second modification, a reading concave portion 30 is formed in the bottom surface 11 of the reading unit 2. The reading concave portion 30 is concaved so as to be separated from the top cover 52 of the image forming unit 1. In addition, the reading concave portion 30 faces the concave portion 52a of the top cover 52, and the reading concave portion 30 is disposed such that at least a portion of the reading concave portion 30 overlaps with the concave portion 52a in the Y-axis direction.

In addition, the first duct 22 of the second modification is formed by the concave portion 52a and the reading concave portion 30. Thus, the cross-sectional area of the first duct 22 of the second modification can be made larger than the cross-sectional area of the first duct 22 (see FIG. 1A) of the present embodiment. As a result, the amount of air flow that flows from the discharging space 10 into the first duct 22 increases, and the occurrence of image defect and dew condensation can be further suppressed.

Third Modification

Figure 7A:
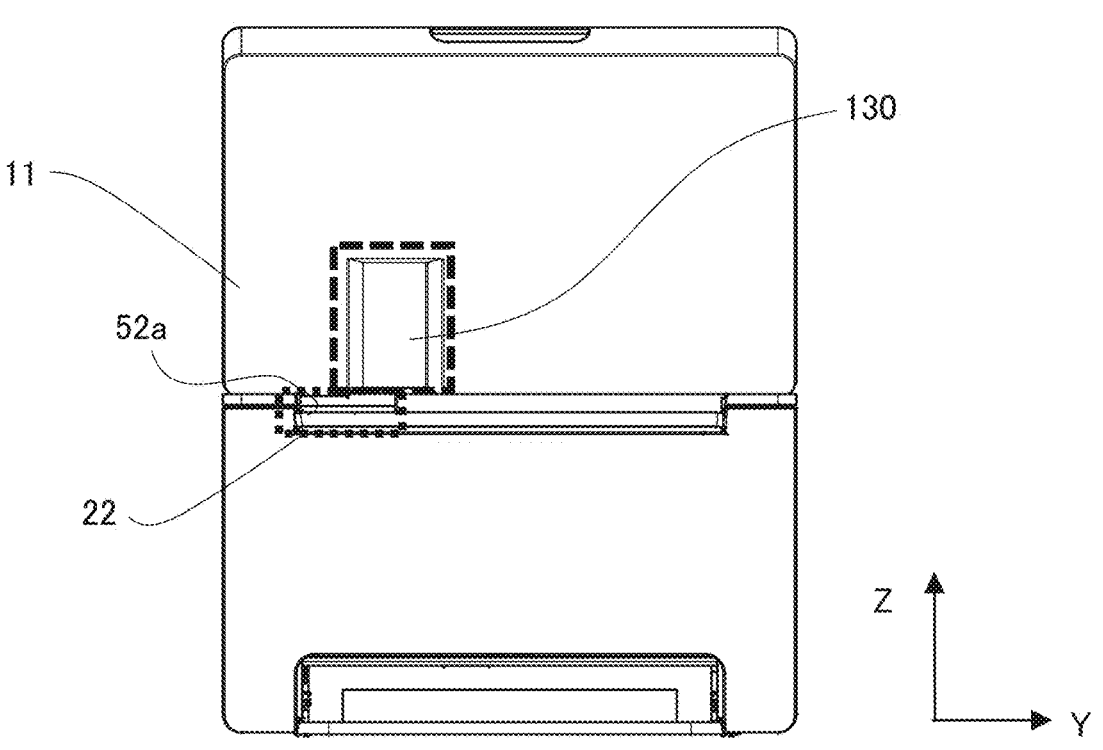
FIG. 7A is a front view illustrating an image forming apparatus of a third modification.
Figure 7B:
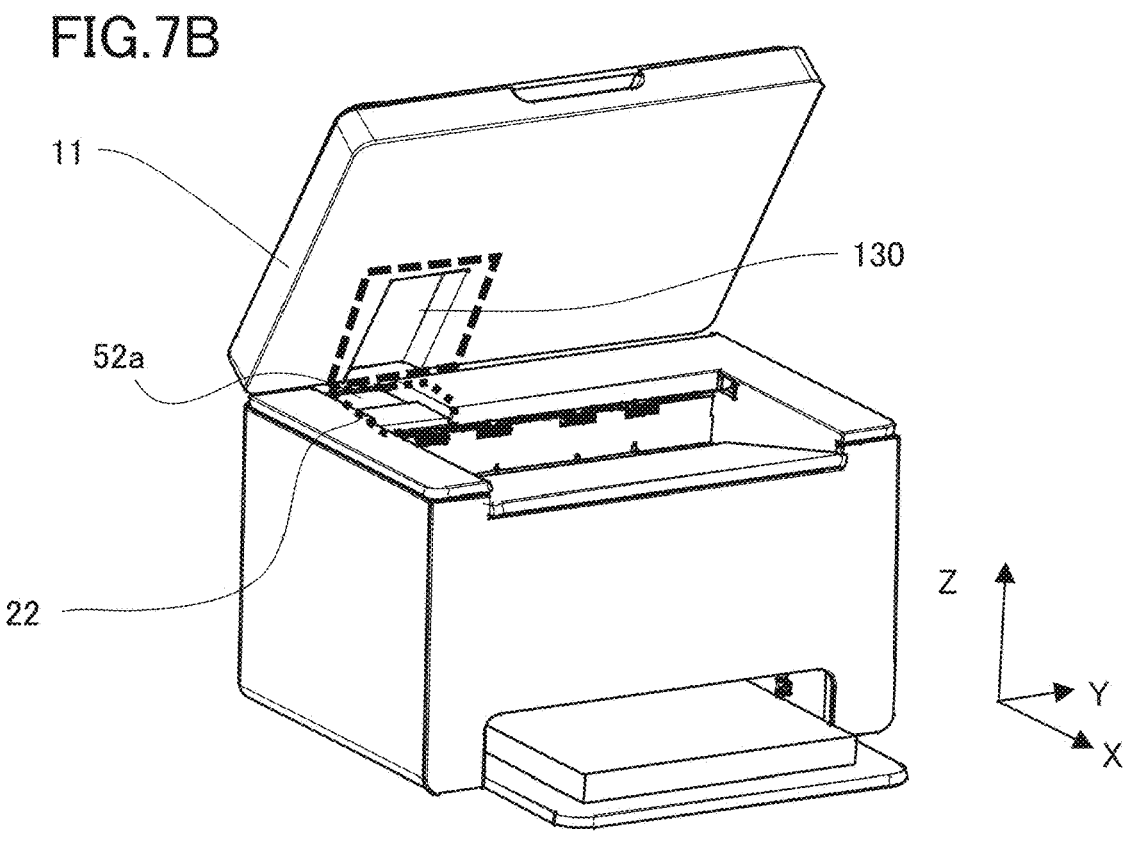
FIG. 7B is a perspective view illustrating the image forming apparatus of the third modification.

FIG. 7A is a front view illustrating an image forming apparatus 100 of a third modification. FIG. 7B is a perspective view illustrating the image forming apparatus 100 of the third modification. In the third modification, as illustrated in FIGS. 7A and 7B, a reading concave portion 130 is formed in the bottom surface 11 of the reading unit 2. The reading concave portion 130 is concaved so as to be separated from the top cover 52 of the image forming unit 1.

The reading concave portion 130 is shifted from the reading concave portion 30 of the second modification in the Y-axis direction. However, the reading concave portion 130 also faces the concave portion 52*a* of the top cover 52, and the reading concave portion 130 is disposed such that at least a portion of the reading concave portion 130 overlaps with the concave portion 52*a* in the Y-axis direction. Thus, the same effects as those of the second modification can be produced, and the flexibility in design can be improved.

Fourth Modification

Figure 8:
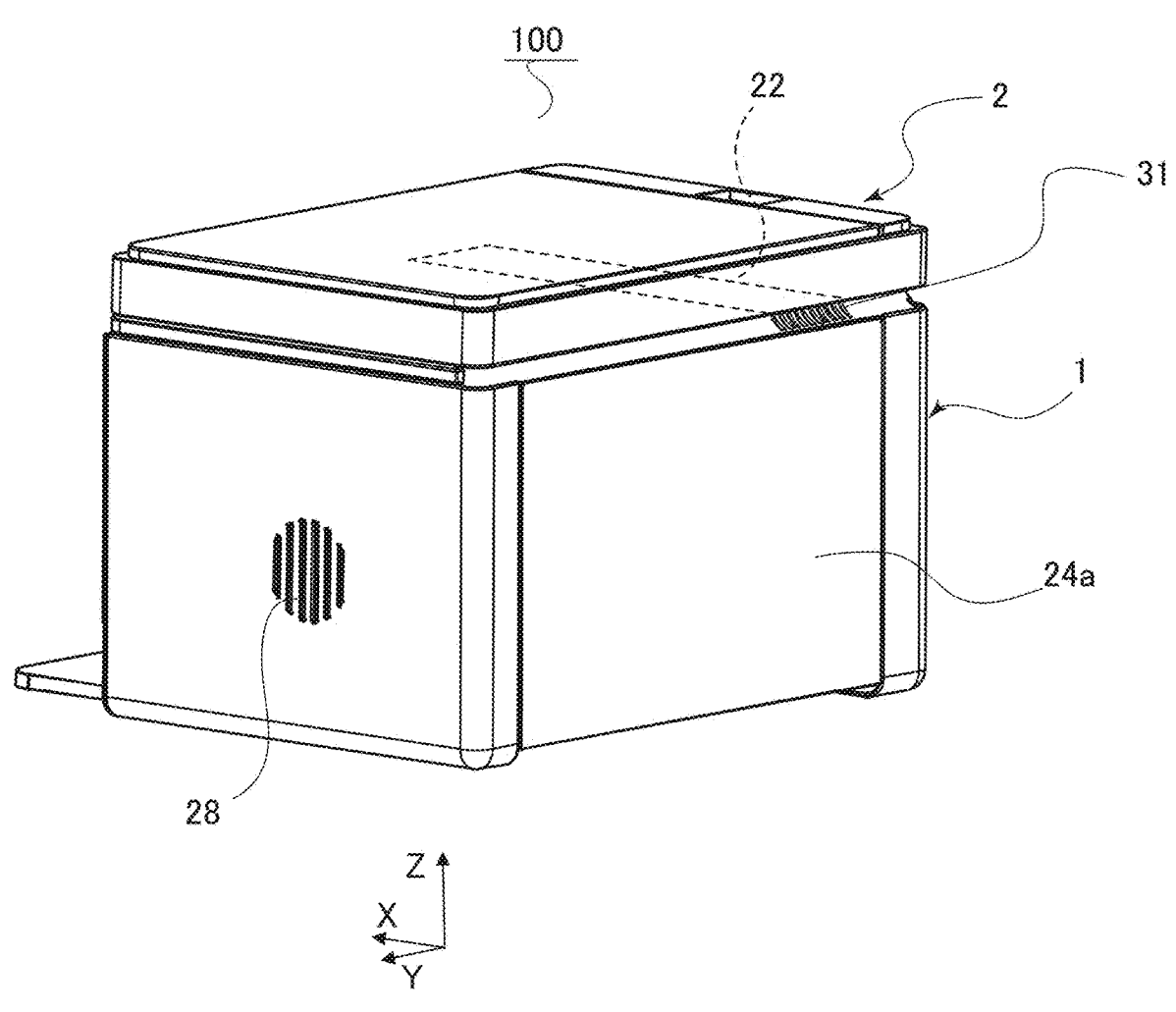
FIG. 8 is a perspective view illustrating an image forming apparatus of a fourth modification.

FIG. 8 is a perspective view illustrating an image forming apparatus 100 of a fourth modification. As illustrated in FIG. 8, an opening of the first duct 22 of the fourth modification that is opened on the back surface 24*a* side is provided with a discharge louver 31. This improves the design.

Other Embodiments

In the present embodiment, the air flow that passes through the second duct 15 flows in the −Y direction. However, the present disclosure is not limited to this. For example, the fan 13 and the intermediate duct 14 may be disposed on the −Y direction side (i.e., the left side) of the discharging space 10, and the air flow that passes through the second duct 15 may flow in the Y direction. In this case, it is preferable that the first duct 22 be disposed closer to the first side-surface 23*a*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-215202, filed Dec. 20, 2023, which is hereby incorporated by reference herein in its entirety.

What is claimed is:

1. An image forming apparatus comprising:
   a reading unit including a reading portion configured to read an image of a document;
   an image forming unit disposed below the reading unit and configured to form a discharging space between the reading unit and the image forming unit, the image forming unit including:
   an image bearing member configured to bear a toner image to be transferred to a sheet;
   a fixing portion configured to fix the toner image to the sheet by applying heat and pressure to the sheet; and
   a discharging portion configured to discharge the sheet, that has passed through the fixing portion, toward the discharging space in a sheet discharging direction; and
   a first duct extending in a first direction and configured to communicate an outside surface of the image forming unit to the discharging space, the first direction being along the sheet discharging direction and orthogonal to a rotation-axis direction of the image bearing member, the outside surface being formed on an upstream side of the image forming unit in the sheet discharging direction,
   wherein the image forming unit includes a second duct which extends in the rotation-axis direction, and through which an air flow cooling the sheet discharged by the discharging portion passes,
   wherein at least a portion of the first duct is disposed so as to be located at the same position as the second duct in a second direction orthogonal to both of the first direction and the rotation-axis direction,
   wherein the image forming unit includes:
   a stacking surface on which the sheet discharged by the discharging portion is stacked;
   a rising surface in which a sheet discharge port is formed, and which extends in both of the rotation-axis direction and the second direction, the sheet discharge port being a port through which the sheet discharged by the discharging portion passes;
   a first side-surface formed on a first side of the stacking surface in the rotation-axis direction; and
   a second side-surface formed on a second side of the stacking surface in the rotation-axis direction,
   wherein the discharging space is formed by the stacking surface, the rising surface, the first side-surface, the second side-surface, and a bottom surface of the reading unit,
   wherein a width of the first duct is smaller than a width of the stacking surface in the rotation-axis direction, and
   wherein the first duct is disposed at a position closer to the second side-surface than the first side-surface in the rotation-axis direction.

2. The image forming apparatus according to claim 1, wherein when a direction from the first side-surface toward the second side-surface in the rotation-axis direction is a first axis direction, the image forming unit includes a fan configured to generate an air flow that flows in the second duct in a first axis direction.

3. The image forming apparatus according to claim 2, wherein the rising surface includes a first discharge port configured to communicate the second duct to the discharging space and discharge a first air flow toward the discharging space in the sheet discharging direction, the first air flow cooling the sheet discharged by the discharging portion,
   wherein the first side-surface includes a second discharge port configured to communicate with the discharging space and discharge a second air flow toward the discharging space in the first axis direction, the second air flow being a part of the air flow generated by the fan, and
   wherein the first air flow and the second air flow merge in the discharging space.

4. The image forming apparatus according to claim 3, wherein the image forming unit includes a third duct configured to guide the air flow generated by the fan to the second duct, and
   wherein the fan and the third duct are disposed upstream of the discharging space in the first axis direction.

5. The image forming apparatus according to claim 2, wherein an air flow that flows in the third duct is divided into an air flow that flows toward the second duct and an air flow that flows toward the second discharge port.

6. The image forming apparatus according to claim 1, wherein the image forming unit includes:
   a top cover configured to face the bottom surface of the reading unit; and
   a concave portion formed in the top cover and concaved so as to be separated from the bottom surface, and
   wherein the first duct is formed by the bottom surface of the reading unit and the concave portion.

7. The image forming apparatus according to claim 6, wherein the bottom surface of the reading unit includes a reading concave portion concaved so as to be separated away from the top cover of the image forming unit, and wherein at least a portion of the reading concave portion is disposed so as to overlap, in the rotation-axis direction, with the concave portion formed in the top cover.

8. The image forming apparatus according to claim 1, wherein the first duct is formed so as not to overlap with the second duct in the rotation-axis direction.

9. The image forming apparatus according to claim 1, wherein a portion of the first duct is formed so as to overlap with the second duct in the rotation-axis direction.

10. The image forming apparatus according to claim 1, wherein the first direction is parallel to a horizontal direction and is orthogonal to the rotation-axis direction, and wherein the second direction is a direction parallel to a vertical direction.

\* \* \* \* \*